United States Patent [19]

Sorimachi et al.

[11] Patent Number: 4,677,778
[45] Date of Patent: Jul. 7, 1987

[54] SHEET MANIPULATING APPARATUS

[75] Inventors: Kanehiro Sorimachi; Makoto Tamari, both of Yokohama, Japan

[73] Assignee: Canon Kabushiki Kaisha, Tokyo, Japan

[21] Appl. No.: 920,942

[22] Filed: Oct. 20, 1986

Related U.S. Application Data

[63] Continuation-in-part of Ser. No. 566,547, Dec. 29, 1983, abandoned.

[30] Foreign Application Priority Data

Jan. 7, 1983 [JP] Japan .................................. 58-973

[51] Int. Cl.$^4$ .............................................. G09F 11/00
[52] U.S. Cl. ........................................ 40/476; 40/531; 84/518; 271/21
[58] Field of Search .................... 40/476, 531, 532; 24/563; 403/109; 101/72; 414/1, 123, 120, 119, 118; 271/19, 21, 22, 25, 37, 109, 111, 114, 120, 225; 84/486, 487, 488, 489, 518

[56] References Cited

U.S. PATENT DOCUMENTS

| | | | |
|---|---|---|---|
| 519,302 | 5/1894 | Darley, Jr. ............................ | 84/518 |
| 541,900 | 7/1895 | Thomsen et al. ...................... | 84/518 |
| 749,667 | 1/1904 | Engelking ............................. | 84/518 |
| 1,069,122 | 8/1913 | Friedman ............................. | 40/531 |
| 1,173,819 | 2/1916 | Logan .................................. | 40/531 |
| 2,449,728 | 9/1948 | Snethun .............................. | 24/563 |
| 2,601,047 | 6/1952 | Merrion ............................... | 40/531 |
| 2,897,618 | 8/1959 | Russell ................................ | 40/531 |
| 3,425,685 | 2/1969 | Liva .................................... | 271/21 |
| 3,484,970 | 12/1969 | Berlinsky et al. ..................... | 40/531 |
| 3,570,154 | 3/1971 | Cosenza .............................. | 40/531 |
| 3,800,453 | 4/1974 | Kroes .................................. | 40/531 |
| 3,939,587 | 2/1976 | Weststrom .......................... | 40/531 |
| 4,160,334 | 7/1979 | Willis .................................. | 84/487 |
| 4,436,298 | 3/1984 | Donner et al. ...................... | 271/111 |
| 4,466,649 | 8/1984 | Ozawa ................................ | 403/109 |
| 4,488,367 | 12/1984 | Yamauchi et al. ................... | 40/531 |

FOREIGN PATENT DOCUMENTS

| | | | |
|---|---|---|---|
| 262281 | 7/1913 | Fed. Rep. of Germany ........ | 271/21 |
| 348830 | 5/1931 | Fed. Rep. of Germany ........ | 40/531 |
| 906562 | 5/1945 | France ................................ | 271/21 |

Primary Examiner—Robert Peshock
Assistant Examiner—J. Hakomaki
Attorney, Agent, or Firm—Fitzpatrick, Cella, Harper & Scinto

[57] ABSTRACT

A working apparatus comprises a plurality of rollers and a control unit for controlling rotation or movement of the rollers. The control unit controls the rollers such that at least one of the rollers is located on the opposite side of the other rollers with respect to a sheet.

4 Claims, 16 Drawing Figures

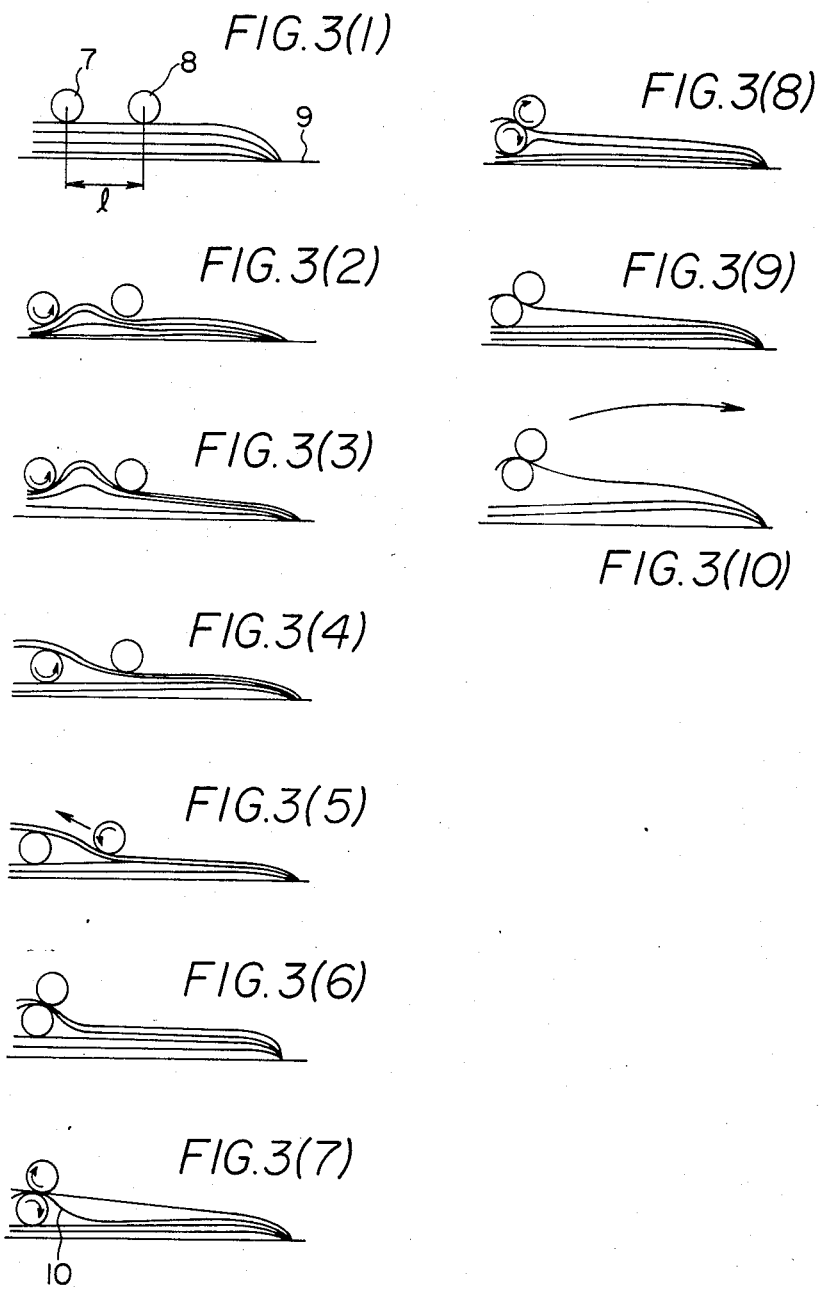

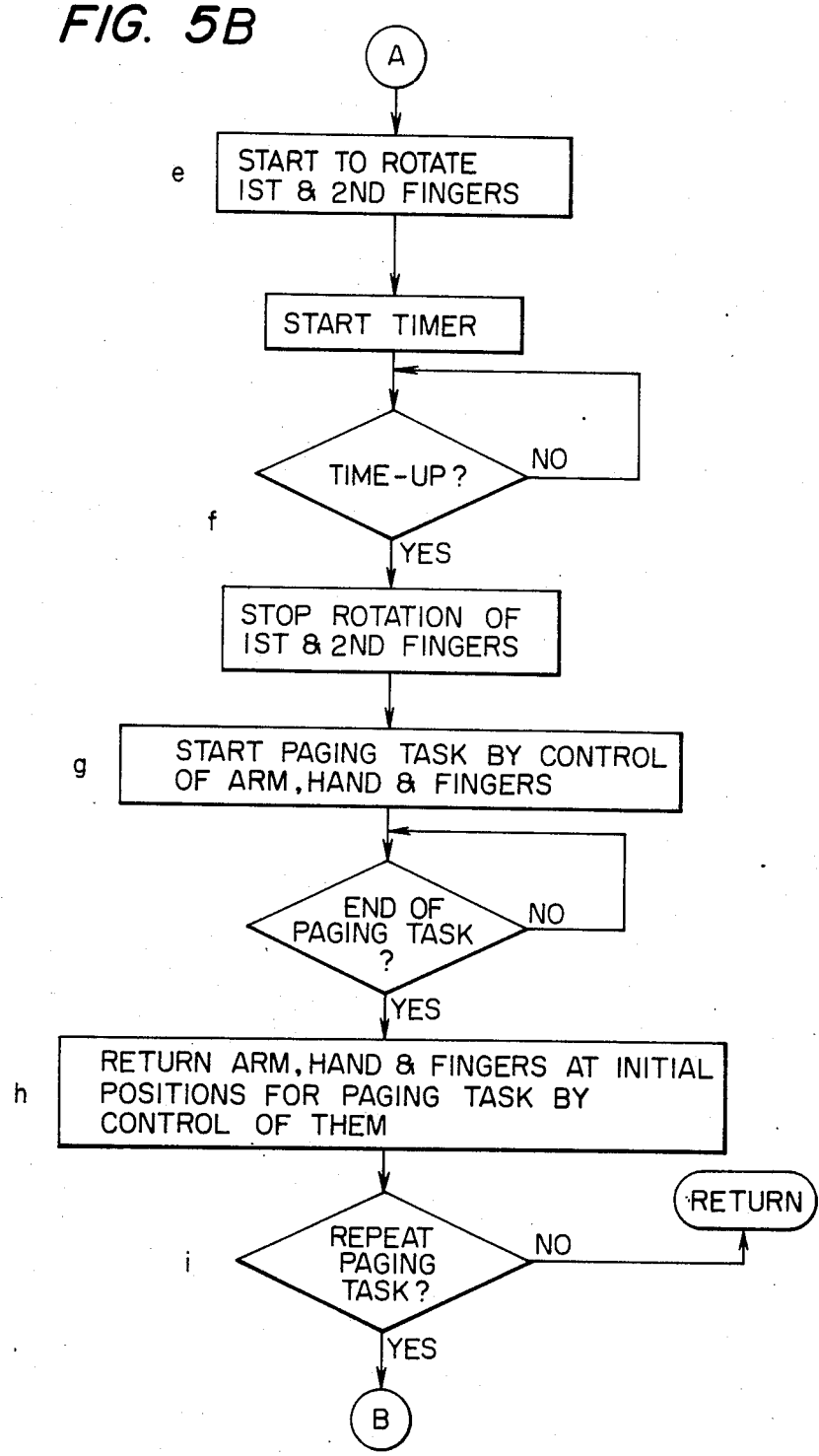

SHEET MANIPULATING APPARATUS

This application is a continuation-in-part of application Ser. No. 566,547 filed Dec. 29, 1983 now abandoned.

BACKGROUND OF THE INVENTION

1. Field of the Invention

The present invention relates to a working apparatus for handling a sheet by a robot arm or finger.

2. Description of the Prior Art

In prior art working apparatus such as an industrial robot or welding robot, positioning mechanisms have had little freedom and the entire apparatus is fixed in many cases. Accordingly, it is hard to provide a feed device of a copying machine or an automatic paging device for a passbook, unless sheets of a predetermined material are handled at a predetermined position and in a specific application. Even in such devices, sheets are double fed, folded, broken or jammed and perfect sheet feeding is not attained.

When sheets are to be handled without limitation to the mount location of the sheets and the material of the sheets, further problems are encountered. For example, when books or documents of various types are to be turned page by page, it is almost impossible to turn pages of the book or documents unless the size of the sheets is fixed because of various sizes and materials of the sheets.

One prior art technique for a sheet handling device is shown in Japanese Laid-Open Patent Application 58-139939, in which a double-feed of the sheets is prevented by an air suction mechanism. Several sheets are sucked by the air suction mechanism and the extra sucked sheets except one are returned by an air jet from an original document sucking device and a rotating member and a back side of the one sucked sheet is sucked by the original document sucking device and the suction of the sheet is checked by monitoring a load current to a suction blower. If only one sheet has been separated, the original document sucking device presses the remaining sheets and the separated sheet is fed to a feed unit.

In the above patent application, the sheet double-feed prevention device prevents a double-feed of sheets in a stationary apparatus such as a copying machine, electronic file facsimile or printer which does not require positioning. It needs a duct, a vacuum chamber and a suction blower and hence the apparatus is large and cannot operate at a high speed. It also cannot turn a page of a book.

SUMMARY OF THE INVENTION

It is an object of the present invention to provide a working apparatus which eliminates the disadvantages described above.

It is another object of the present invention to provide a working apparatus which handles articles without being affected by a mount location of the articles and the material of the articles.

It is other object of the present invention to provide a working apparatus which can pick up a sheet without regard to the condition of the sheets.

DETAILED DESCRIPTION OF THE PREFERRED EMBODIMENTS

Figure 1:
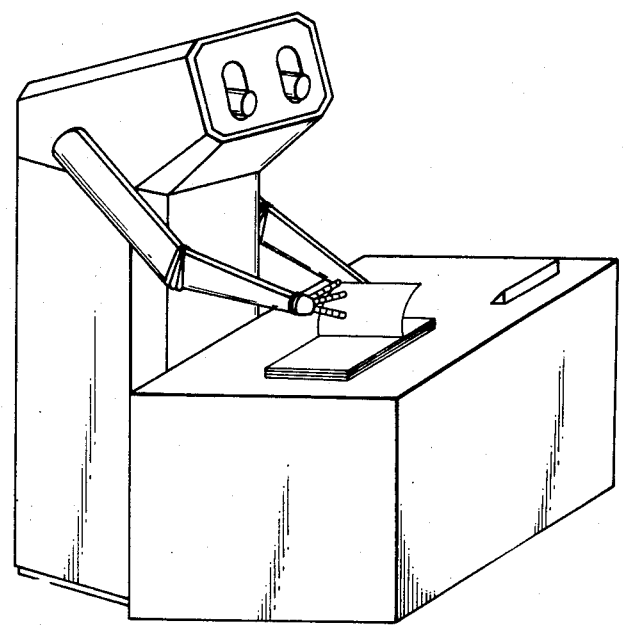
FIG. 1 illustrates a paging operation of a robot in accordance with one embodiment of the present invention.

FIG. 1 shows a robot for handling sheets in accordance with one embodiment of the present invention. The robot handles the sheets, for example, to turn the pages of a book page by page by arm control, hand control and finger control.

Figure 2A:
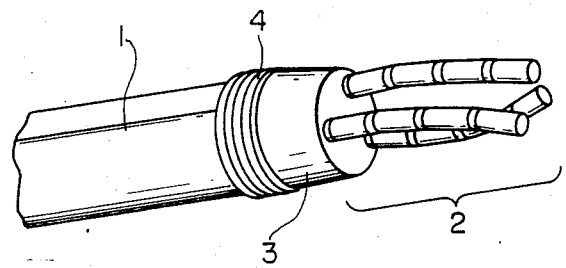
FIG. 2a shows a hand of the robot of the embodiment of the present invention.
Figure 2B:
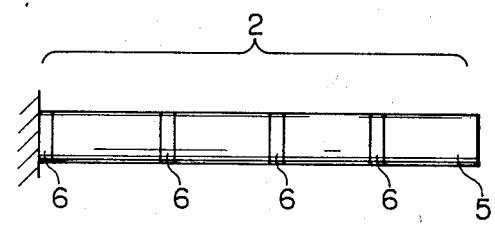
FIG. 2b shows a detail of fingers 2 in FIG. 2a, FIG. 3 is a front view illustrating a paging operation for a book by two of the fingers 2 shown in FIG. 2a, FIG. 4 is a block diagram of a CPU 10 for controlling the operation of FIG. 3 and a peripheral circuit, and FIG. 5 composed of FIGS. 5A and 5B is a flow chart of the CPU 10 for controlling the operation of FIG. 3.

FIG. 2a shows a hand of the robot of the embodiment of the present invention. Numeral 1 denotes a portion of an arm coupled to a robot body, and numeral 2 denotes fingers. Three fingers are used in the present embodiment although any number of fingers may be used as required. Numeral 3 denotes a palm and numeral 4 denotes an articulation for allowing rotation and bending of the palm. FIG. 2b shows a detail of the fingers 2 of FIG. 2a. Numeral 5 denotes a tip end of the finger 2, on which a rubber roller is mounted to facilitate turning the pages of the sheets. The rubber roller may be mounted at any portion of the finger. Numeral 6 denotes articulations for allowing rotation and bending of the finger.

FIG. 3 illustrates a page turning operation for a book by two of the fingers 2 shown in FIG. 2a. The fingers are controlled by a microcomputer to be described later. Numerals 7 and 8 denote sectional views of the two fingers shown in FIG. 2a. Numeral 7 denotes a first finger and numeral 8 denotes a second finger. The first finger 7 and the second finger 8 contact a sheet of the book 9 by the rubber rollers at the tip ends 5. The turning of the pages of the book may be done either rightwardly or leftwardly.

Figure 4:
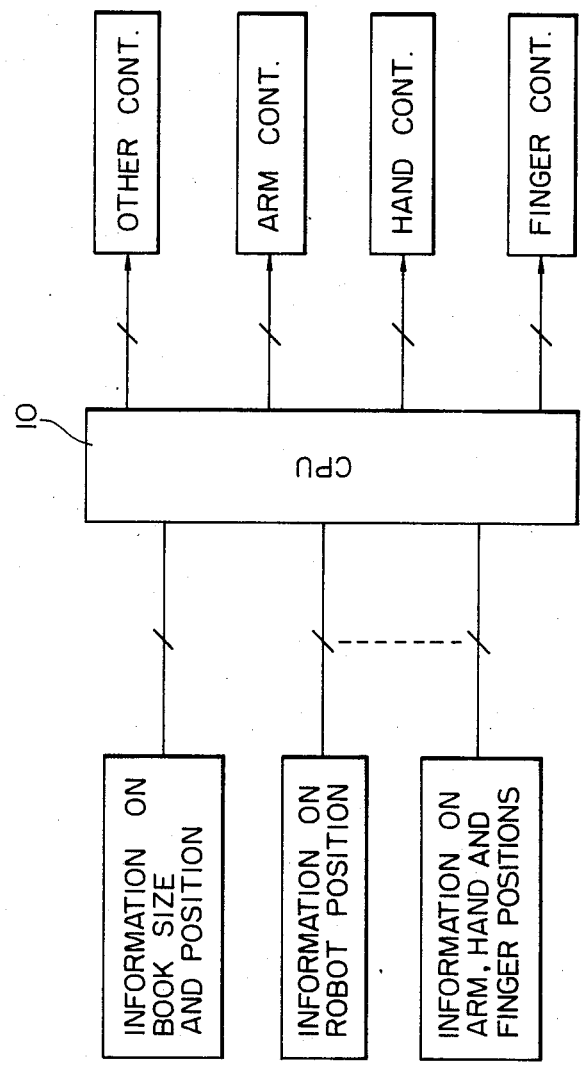
Figure 5A:
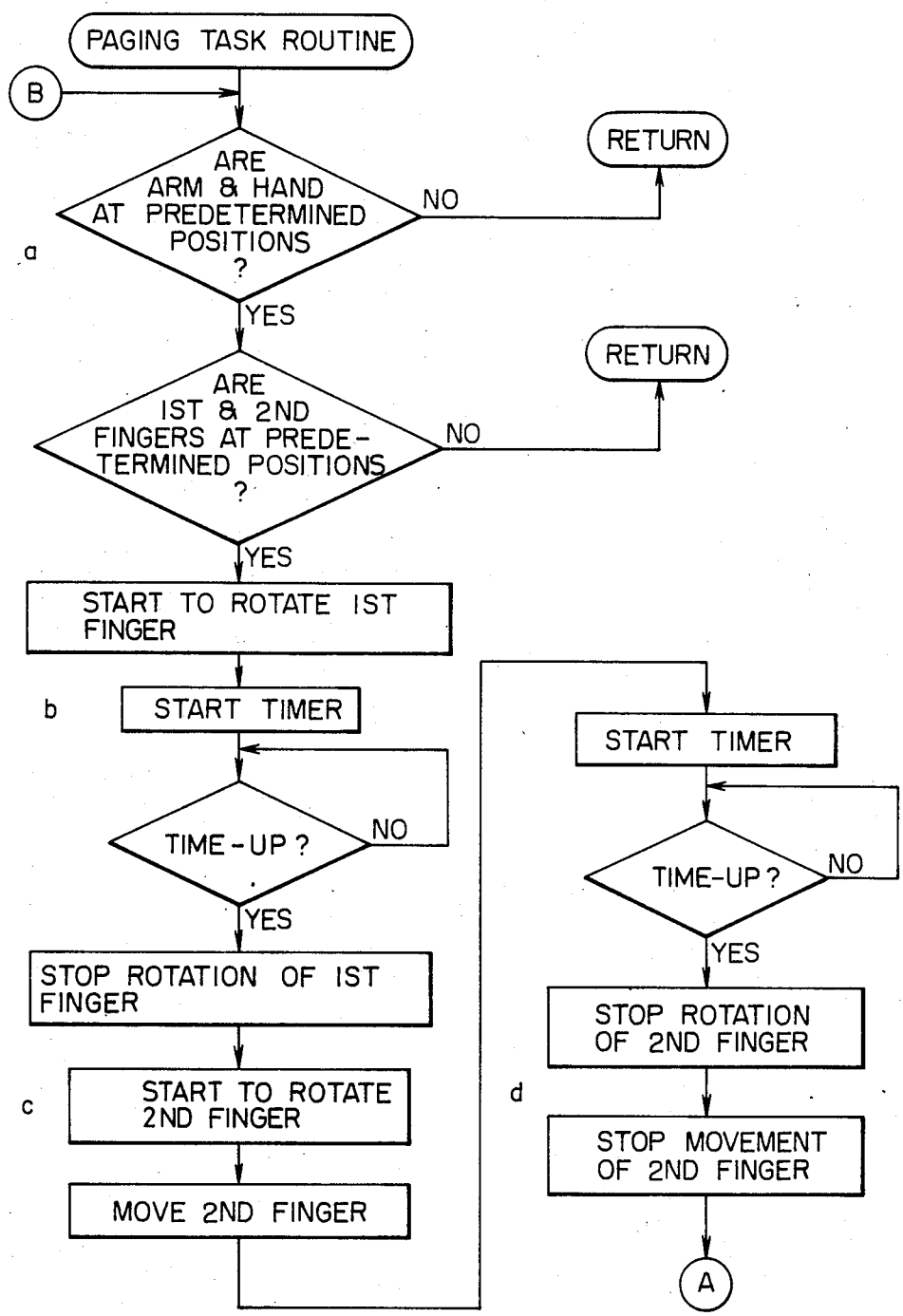

FIG. 4 shows a block diagram of a CPU 10 which controls the operation of FIG. 3 and a peripheral circuit. FIG. 5 shows a flow chart of the CPU 10 which controls the operation of FIG. 3. The CPU 10 controls the arms, the hands and the fingers in accordance with inputs shown in FIG. 4.

FIGS. 3, 4 and 5 are now explained in detail. In FIG. 3 (1), the first finger 7 and the second finger 8 are disposed at any arbitrary location on a sheet of the book 9 at a space of l (step a in FIG. 5). In FIG. 3 (2), the first finger 7 starts to rotate in a direction of an arrow. A timer which is set by a material of the sheet sensed depending on the sensor such as piezoelectric device, strain gauge semiconductor pressure sensor or piezoelectric film and in accordance with the space l between the first and second fingers, is started (step b in FIG. 5). The rotation and the pressing force of the finger may be controlled by the data sensed by the above sensor. In FIG. 3 (3), the sheet is raised by the rotation of the first finger, which is thus moved to be under the sheet, FIG. 3 (4). When the timer times out, the rotation of the first finger is stopped and the second finger starts to rotate in the direction of the arrow shown in FIG. 3 (5). The second finger also starts to move translationally in the direction of the arrow shown in FIG. 3 (5) while it rolls, to cancel the frictional force between the sheet and the second finger. The timer is started simultaneously (step c in FIG. 5). When the timer times out, the rotation and the movement of the second finger are stopped (step d in FIG. 5, FIG. 3 (6)).

In FIG. 3 (7), the first and second fingers start to rotate in the directions of arrows and the timer is started (step e in FIG. 5). If more than one sheets is present between the first and second fingers, the sheet closer to the first finger (sheet 10 in FIG. 3 (7)) is removed from the space between the first and second fingers, as shown in FIG. 3 (8).

When the timer times out, the rotation of the first and second fingers is stopped (step f in FIG. 5, FIG. 3 (9)).

In this manner, one page of the book 9 is selected, and in FIG. 3 (10) the selected page is turned over in a direction of an arrow shown in FIG. 3 (10) at a radius determined by a width of the book (step g in FIG. 5). After the page has been turned over, the arms, the hand and the fingers are returned to the initial positions of the page turning operation by the arm, hand and finger controls (step h in FIG. 5). If the page turning operation is to be repeated, the above steps are repeated from the start point of the page turning paging task routine of the flow chart shown in FIG. 5. If the page turning operation is terminated, the control returns to a main program of the robot (step i in FIG. 5). While the CPU 10 is a peripheral CPU in the robot, a main CPU in the robot may control the page turning operation.

In addition to the embodiment described above, the rotation and the translational movement of the finger may be controlled by detection means such as photo-sensor instead of a timer. In the page turning operation shown in FIG. 3 (10), a third finger may be mounted on the sheet to the turned over as an auxiliary paging means. The book may be pressed by the hand and the fingers of one of the hands. Forms of an output device in a computer or a word processor can be loaded or exchanged by the present apparatus.

The sheets can be handled one by one without regard to the material of the sheets and hence the sheet handling operation in the copying machine and any other machine is speeded up and effectively carried out.

What we claim is:

1. A working apparatus for manipulating a sheet comprising:
    arm means having a plurality of finger means disposed at an end of said arm means for contacting a sheet;
    a plurality of roller means provided on said finger means;
    sensor means provided on at least one of said finger means for detecting a condition of the sheet; and
    control means responsive to the output of said sensor means for controlling the force of said roller means against the sheet, said control means being adapted to provide at least one of rotational and translational movement of said roller means to pick up one sheet from a layer of sheets between said roller means,
    wherein said control means (i) positions two of said roller means, apart from each other by a predetermined distance, on a portion of a top sheet on the layer, (ii) effects rotational movement, and translational movement toward one of said roller means such that the other of said two roller means is positioned at an opposite side of the top sheet from which said one roller means is positioned, (iii) causes said one and said other roller means to be rotated in opposite directions such that only the top sheet is picked up between said two roller means, and (iv) effects the translational movement of said arm means and finger means such that only the top sheet of the layer is picked up and turned without moving the remaining sheets.

2. A working apparatus according to claim 1, wherein said arm means and finger means form a part of a working apparatus capable of loading or replacing sheets.

3. A working apparatus for manipulating a sheet comprising:
    arm means having a plurality of finger means disposed at an end of said arm means for contacting a sheet;
    a plurality of roller means provided on said finger means;
    input means for inputting condition position, size or the like of said sheet;
    control means responsive to the input means for controlling the position of said roller means and the force of said roller means against the sheet, said control means being adapted to provide at least one of rotational and translational movement of said roller means to pick up one sheet from a layer of sheets between said roller means,
    wherein said control means (i) positions two of said roller means, apart from each other by a predetermined distance, on a portion of a top sheet on the layer, (ii) effects rotational movement, and translational movement toward one of said roller means by the predetermined distance, of another one of said roller means such that said another roller means is positioned at an opposite side of the top sheet from which said one roller means is positioned, (iii) causes said one and said another roller means to be rotated in opposite directions such that the top sheet is picked up between said two roller means, (iv) effects the translational movement of said arm means and finger means such that only the top sheet of said layer is picked up and turned without moving the remaining sheets, and (v) controls the positions of said arm means and finger means such that the top sheet is held during the picking up operation of the top sheet.

4. A working apparatus according to claim 3, wherein said arm means and finger means form a part of a working apparatus capable of loading or replacing sheets.

* * * * *

UNITED STATES PATENT AND TRADEMARK OFFICE
CERTIFICATE OF CORRECTION

PATENT NO. : 4,677,778　　　　　　　Page 1 of 2
DATED : July 7, 1987
INVENTOR(S) : KANEHIRO SORIMACHI, ET AL.

It is certified that error appears in the above-identified patent and that said Letters Patent is hereby corrected as shown below:

On the title page

AT [56] FOREIGN PATENT DOCUMENTS

"348830  5/1931  Fed. Rep. of Germany......40/531"
should read --348830  5/1931  United Kingdom....40/531--.

COLUMN 1

Line 66, "other" should read --another--.

COLUMN 2

Line 58, "by a" should read --depending on the--.
Line 59, "depending on the" should read --by a--.

UNITED STATES PATENT AND TRADEMARK OFFICE
CERTIFICATE OF CORRECTION

PATENT NO. : 4,677,778          Page 2 of 2

DATED : July 7, 1987

INVENTOR(S) : KANEHIRO SORIMACHI, ET AL.

It is certified that error appears in the above-identified patent and that said Letters Patent is hereby corrected as shown below:

COLUMN 3

Line 11, "sheets" should read --sheet--.
Line 27, Delete "paging".
Line 38, "the turned" should read --be turned--.

Signed and Sealed this

Twenty-fourth Day of November, 1987

*Attest:*

DONALD J. QUIGG

*Attesting Officer*      *Commissioner of Patents and Trademarks*